Patented Mar. 3, 1942

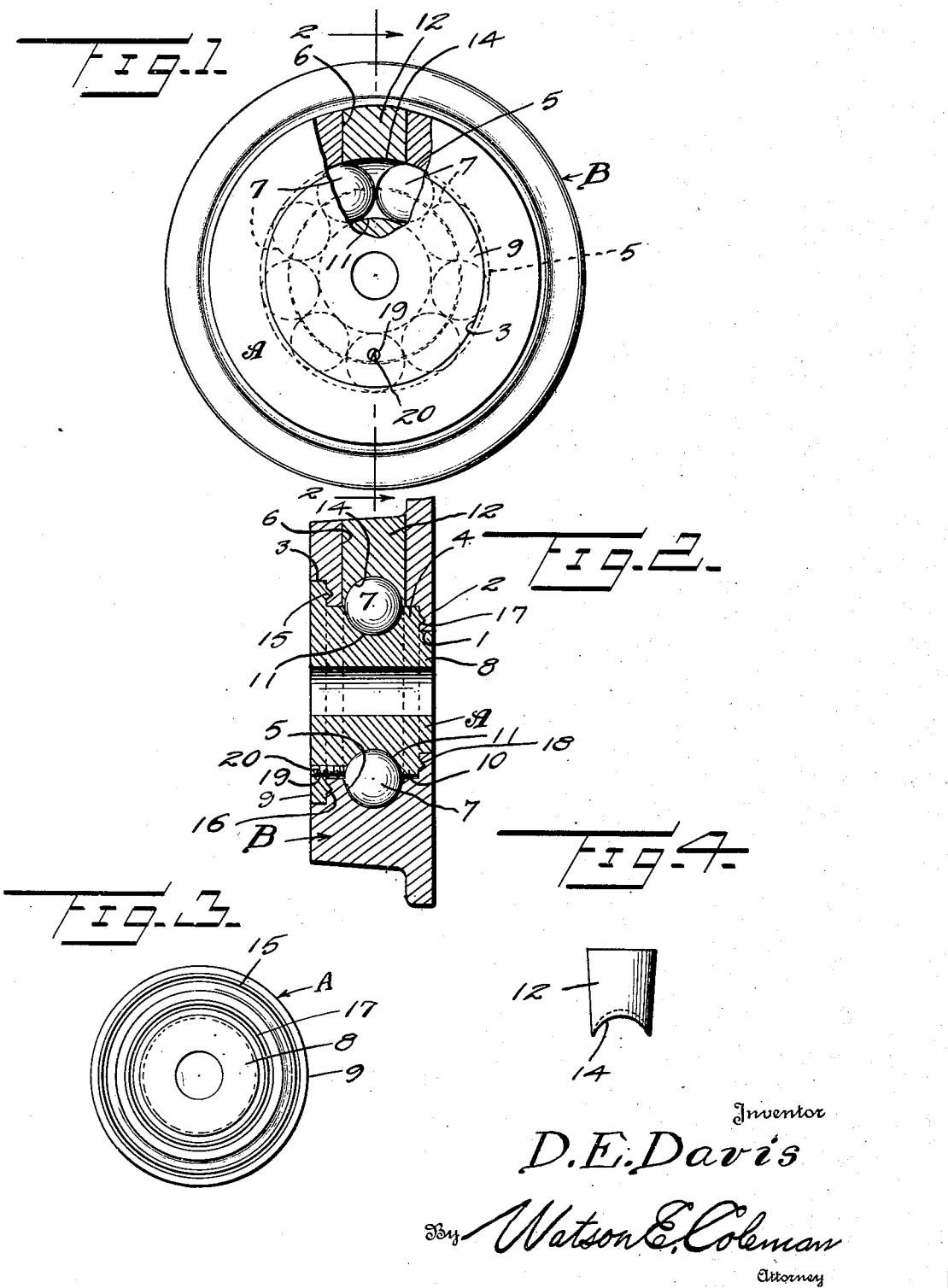

2,274,779

UNITED STATES PATENT OFFICE 2,274,779

BEARING STRUCTURE

Daniel E. Davis, San Saba, Tex.

Application June 6, 1939, Serial No. 277,727

1 Claim. (Cl. 308—187.2)

This invention relates to a bearing structure, and it is an object of the invention to provide a structure of this kind comprising two relative rotatable members revolving about a common axis, one of said members constituting what may be termed the "hub" and the other member constituting what may be called the "rim."

It is also an object of the invention to provide a device of this kind so constructed and assembled wherein the parts are effectively held in assembled relation through the instrumentality of interposed ball bearings and wherein the parts are so formed and designed to effectively retain lubricant within the races or runways for said balls.

The invention has for a further object to provide a bearing structure of this kind which, when assembled, is provided with means whereby the lubricant within the runways or races may be readily and conveniently renewed.

An additional object of the invention is to provide a bearing structure of this kind including a hub member and a surrounding rim member with interposed balls together with coacting means carried by the hub member and the rim member to throw back into the runways or races for said balls such lubricant within the runways or races which may have a tendency to escape.

The invention consists in the details of construction and in the combination and arrangement of the several parts of my improved bearing structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in side elevation of a bearing structure constructed in accordance with an embodiment of my invention, a portion being broken away;

Figure 2 is a sectional view taken substantially on the line 2—2 of Figure 1;

Figure 3 is a view in end elevation of the hub member unapplied;

Figure 4 is a view unapplied of the plug for closing the delivery opening to the runways or races.

As illustrated in the accompanying drawing, my improved bearing structure is such as to permit the same to be readily employed as a car wheel or the like although I wish it to be understood that I do not limit myself in this respect as this bearing structure is capable of other uses.

In the accompanying drawing, A denotes a hub member and B denotes a rim member and when my improved structure is to be used as a car wheel or the like the hub member A is non-rotatably mounted upon a suitable supporting axle while the rim member B is free to rotate around such hub member. However, with other uses the rim member B may be maintained stationary and the hub member A allowed to rotate.

The rim member B, as herein disclosed, is provided at its axial center with an opening 1 extending therethrough, said opening being of a stepped type wherein one end of the hub member is formed to provide an inwardly disposed surrounding flange 2 while the opposite end portion of said opening 1 is provided with a surrounding rabbet 3. The intermediate portion 4 of the opening 1 is relatively long and is provided therearound with a runway or race 5. This runway or race 5 extends a major distance across this intermediate portion 4 and is of considerable depth.

Extending radially inwardly of the rim member B from the periphery thereof is an opening 6 of such diameter as to readily permit the passage therethrough of the ball bearings 7. These ball bearings 7, however, are not inserted through the opening 6 until after the rim member B has been placed in proper assembly with respect to the hub member A.

The hub member A, as herein disclosed, is provided at one end with a reduced extension 8 which is snugly received within the opening defined by the flange 2 of the rim member B while the opposite end portion of this hub member A is defined by an outstanding surrounding flange 9 which is snugly received within the rabbet 3 hereinbefore referred to.

The intermediate portion 10 of the hub member A is snugly received within the opening defined by the portion 4 of the rim member B. This portion 10 of the hub member A is provided therearound with the relatively broad and deep runway or race 11 which registers with the runway or race 5 of the rim member B when the same is in applied or assembled position with respect to the hub member A.

After the assembly of the members A and B the proper number of balls 7 are inserted through the opening 6 which at this time is preferably upwardly disposed, and after the required number of balls have been received within the registering runways or races 5 and 11 the opening 6 is closed by a plug 12, the inner end of which is grooved, as at 14, to register with the runway or race 5 of the rim member B. As illustrated in Figure 4, this plug 12 is slightly tapered so that as it is driven down into the opening 6 it will be effectively wedged therein and thereby held against accidental displacement.

When the bearing structure is to be used as a car wheel or the like as illustrated in the accompanying drawing, the outer end portion of the applied plug 12 is fused and then machined or smoothed off to assure the proper tread surface.

The runways or races 5 and 11 serve to effectually hold therein between the applied balls 7 suitable lubricant, preferably hard grease, and the particular formation of the hub member A and the associated construction of the rim member B effectually seals such lubricant within such runways or races. However, to further assure this sealing of the lubricant, the inner face of the flange 9 is provided therearound with an annular bead 15 concentric to the axis of the hub member A and preferably substantially V-shaped in form. This bead 15 is snugly received within an annular groove 16 formed in the adjacent face of the rim member B and which groove 16 is also V-shaped in cross section and of such dimensions as to snugly receive the bead 15 yet eliminating any frictional resistance. The clearance should not be over $1/100$ of an inch.

The end of the hub member A adjacent to the extension 8 is also provided with an outstanding annular bead 17 substantially V-shaped in cross section which snugly engages within the annular groove 18 provided in the inner face of the flange 2 of the rim member B. Relative to the bead 17 and the groove 18 the clearance should also not be more than $1/100$ of an inch.

The hub member A preferably at the outer end portion thereof is provided with an opening or port 19 which opens into the runway or race 11. This port 19 is normally closed by a plug 20 threading therein. The port 19 provides means whereby additional lubricant may be readily forced into the runways or races 5 and 11 when required.

In addition to providing an effective seal against escape of the lubricant, the particular construction of the members A and B as hereinbefore described also provides effective means to prevent ingress of dust or other foreign matter which would otherwise have a tendency to impose undue wear upon the balls 7.

From the foregoing description it is thought to be obvious that a bearing structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice as hereinafter claimed.

I claim:

A bearing structure comprising an outer annular member and an inner member snugly engaging within the annular member, said members having relative rotation, said members having opposed ball races in the intermediate portions thereof, balls engaging within said races holding the outer member and the inner member in assembled relation but allowing relative rotation of said members, the outer member being provided substantially radially therethrough with an opening communicating with the race of said outer member, said opening being of a diameter to permit passage therethrough of the balls, a plug for closing said opening, the inserted end of the plug having a groove in register with the race of the outer member, the opening of the outer member being provided at one end portion with an inwardly disposed continuous flange, the adjacent end of the inner member having a reduced extension snugly fitting within the opening as defined by the flange, the side face of the outer member remote from the flange being provided with a rabbet surrounding the adjacent end of the opening of the outer member, the end portion of the inner member remote from the extension having an outstanding surrounding flange snugly engaging within the rabbet, the flange of the inner member and the adjacent portion of the outer member being provided with an interfitting annular bead and groove to provide a seal, the flange of the outer member and the adjacent portion of the inner member being provided with an interfitting annular bead and channel to provide a seal against the outward passage of lubricant within the races and to exclude ingress of foreign matter, the inner member at the end portion thereof provided with the flange and at a point closely adjacent to such flange being provided with a port communicating with the race of the inner member, and means for closing said port.

DANIEL E. DAVIS.